United States Patent
Li et al.

(10) Patent No.: US 12,328,493 B2
(45) Date of Patent: Jun. 10, 2025

(54) ELECTRONIC DEVICE USING MULTI-FRAME COMPOSITION METHOD

(71) Applicant: VIVO MOBILE COMMUNICATION CO., LTD., Guangdong (CN)

(72) Inventors: Peide Li, Guangdong (CN); Yunfa He, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 147 days.

(21) Appl. No.: 18/344,062

(22) Filed: Jun. 29, 2023

(65) Prior Publication Data

US 2023/0345105 A1    Oct. 26, 2023

Related U.S. Application Data

(63) Continuation of application No. PCT/CN2021/142418, filed on Dec. 29, 2021.

(30) Foreign Application Priority Data

Dec. 31, 2020  (CN) .......................... 202011639286.X (51) Int. Cl.
*H04N 23/55*    (2023.01)
*H04N 23/958*   (2023.01)

(52) U.S. Cl.
CPC .......... *H04N 23/55* (2023.01); *H04N 23/958* (2023.01)

(58) Field of Classification Search
CPC ...... H04N 23/55; H04N 23/958; H04N 23/57; H04N 23/125; H04N 23/45; H04N 23/10; H04N 23/951; H04N 25/10; H04N 25/11; H04N 25/134; H04N 25/48; H04N 5/265;
(Continued)

(56) References Cited

U.S. PATENT DOCUMENTS 7,804,517 B2 * 9/2010 Iwasaki ................ H04N 13/218
                                                    348/46
8,599,374 B1 * 12/2013 Comstock, II ............ G01J 3/36
                                                    356/310
(Continued)

FOREIGN PATENT DOCUMENTS

CN    202617287 U    12/2012
CN    102857668 A     1/2013
(Continued)

*Primary Examiner* — Padma Haliyur
(74) *Attorney, Agent, or Firm* — Price Heneveld LLP (57) ABSTRACT

This application discloses an electronic device and a camera module thereof. The camera module includes a photosensitive chip, a first lens, a second lens, and a plurality of reflective members, where the photosensitive chip is a Bayer array sensor, the photosensitive chip includes a plurality of pixel regions arranged in rows and columns, each pixel region includes four sub pixel regions, fields of view of the first lens and the second lens are the same, and both the first lens and the second lens fit the photosensitive chip by using the plurality of reflective members; and a first image is generated through a first sub pixel region of the photosensitive chip based on light incident from the first lens, a second image is generated through a second sub pixel region of the photosensitive chip based on light incident from the second lens.

16 Claims, 5 Drawing Sheets

(58) Field of Classification Search
CPC .... H04N 23/54; G02B 5/201; G02B 13/0065; G03B 17/17; G03B 30/00; H04M 1/0264
See application file for complete search history.

(56) References Cited

U.S. PATENT DOCUMENTS

| | | | |
|---|---|---|---|
| 8,810,698 B2* | 8/2014 | Hiramoto | H04N 23/54 348/294 |
| 2005/0231590 A1 | 10/2005 | Iwasaki | |
| 2005/0253951 A1* | 11/2005 | Fujimoto | H04N 23/54 348/335 |
| 2006/0087561 A1 | 4/2006 | Kojima et al. | |
| 2010/0172020 A1 | 7/2010 | Price et al. | |
| 2011/0080487 A1 | 4/2011 | Venkataraman | |
| 2012/0074227 A1 | 3/2012 | Ferren et al. | |
| 2013/0278731 A1 | 10/2013 | Inomoto | |
| 2017/0142346 A1 | 5/2017 | Hung et al. | |
| 2018/0136437 A1* | 5/2018 | Ono | G03B 9/06 |
| 2019/0045115 A1 | 2/2019 | Ishihara | |
| 2020/0099898 A1 | 3/2020 | Wan | |
| 2021/0124179 A1* | 4/2021 | Yun | G02B 27/1013 |
| 2024/0155216 A1* | 5/2024 | Hyun | H04N 23/57 |

FOREIGN PATENT DOCUMENTS

| | | |
|---|---|---|
| CN | 104079904 A | 10/2014 |
| CN | 106210677 A | 12/2016 |
| CN | 207148400 U | 3/2018 |
| CN | 110798602 A | 2/2020 |
| CN | 110798605 A | 2/2020 |
| CN | 111602387 A | 8/2020 |
| CN | 112073625 A | 12/2020 |
| CN | 112616008 A | 4/2021 |
| JP | 2006128780 A | 5/2006 |
| JP | 2012506060 A | 3/2012 |
| JP | 2012527820 A | 11/2012 |
| JP | 2013222177 A | 10/2013 |
| JP | 2019029913 A | 2/2019 |
| JP | 2020123862 A | 8/2020 |

* cited by examiner

ELECTRONIC DEVICE USING MULTI-FRAME COMPOSITION METHOD

CROSS-REFERENCE TO RELATED APPLICATIONS

The present application is a continuation application of PCT International Application No. PCT/CN2021/142418 filed on Dec. 29, 2021, which claims priority to Chinese Patent Application No. 202011639286.X, filed with the China National Intellectual Property Administration on Dec. 31, 2020, and entitled "ELECTRONIC DEVICE AND CAMERA MODULE THEREOF", which are incorporated herein by reference in their entireties.

TECHNICAL FIELD

This application pertains to the technical field of communications devices, and specifically relates to an electronic device and a camera module thereof.

BACKGROUND

With the progress of science and technology, an electronic device such as a mobile phone plays an important role in people's production and life, and the electronic device is usually equipped with a camera module to facilitate photographing for a user. As market competition becomes increasingly fierce, the electronic device usually has at least one kind of outstanding performance to distinguish it from another electronic device and enhance its market competitiveness. For example, the electronic device has a higher refresh rate, so that it has higher display performance; or the electronic device has two speakers and has a better audiovisual effect. For another example, the electronic device has better photographing performance. With respect to the photographing performance of the electronic device, performance of the camera module can be improved by using a plurality of approaches.

Using image definition as an example, when a size of a photosensitive chip is fixed, increasing the number of pixels causes photosensitivity of the camera module to decrease and causes adverse impact on an imaging result. Therefore, single-frame interpolation and multi-frame composition are usually used in the industry to improve the definition. However, in a process of generating an image by using single-frame interpolation, because the number of real photosensitive pixels does not increase, a definition improvement effect is limited, and in some scenes, interpolation errors are prone to occur; and in a process of generating an image by using multi-frame composition, it is very difficult to control pixel displacement, and an image composition effect is also poor.

SUMMARY

This application discloses an electronic device and a camera module thereof to improve image definition.

To resolve the foregoing problem, embodiments of this application are implemented as follows:

According to a first aspect, an embodiment of this application discloses a camera module, including a photosensitive chip, a first lens, a second lens, and a plurality of reflective members, where the photosensitive chip is a Bayer array sensor, the photosensitive chip includes a plurality of pixel regions arranged in rows and columns, each pixel region includes four sub pixel regions, fields of view of the first lens and the second lens are the same, and both the first lens and the second lens fit the photosensitive chip by using the plurality of reflective members; and a first image is generated through a first sub pixel region of the photosensitive chip based on light incident from the first lens, a second image is generated through a second sub pixel region of the photosensitive chip based on light incident from the second lens, content of the first image and the second image is the same, and sub pixel regions equivalent to the first sub pixel region and the second sub pixel region in a same pixel region are any two sub pixel regions in the pixel region.

According to a second aspect, an embodiment of this application discloses an electronic device, including the foregoing camera module.

In the camera module provided in the embodiments of this application, the first lens and the second lens fit the photosensitive chip by using the reflective members; when different lenses fit the photosensitive chip, the first image can be generated through the first sub pixel region of the photosensitive chip, and the second image with the same content as the first image can be generated through the second sub pixel region of the photosensitive chip; in addition, the sub pixel regions equivalent to the first sub pixel region and the second sub pixel region in the same pixel region are any two sub pixel regions in the pixel region. Therefore, in two imaging processes, the photosensitive chip obtains different filter processing results for the incident light corresponding to the same position, and further composites the first image and the second image by using a preset algorithm. This can increase real photosensitive pixels of each filter channel in the generated composited image, further improve definition of the image, achieve a better image presentation effect, and improve a final image quality level and user experience.

BRIEF DESCRIPTION OF DRAWINGS

The accompanying drawings described herein are intended for better understanding of this application, and constitute a part of this application. Exemplary embodiments and descriptions thereof in this application are intended to interpret this application and do not constitute any improper limitation on this application. In the accompanying drawings.

Reference numerals in the accompanying drawings are described as follows:

100. housing;

210. first lens; 220. second lens;

310. first reflective member; 320. second reflective member; 330. third reflective member;

400. photosensitive chip; 401. first sub pixel region; 402. second sub pixel region; 403. third sub pixel region; 404. fourth sub pixel region; 401'. first sub pixel region; 402'. second sub pixel region; 403'. third sub pixel region; 404'. fourth sub pixel region;

500. infrared filter;

600. limiting member; 610. first limiting member; 620. second limiting member; 601. limiting base; 602. connecting portion; 603. limiting groove.

DESCRIPTION OF EMBODIMENTS

To make the objectives, technical solutions, and advantages of this application clearer, the following clearly describes the technical solutions of this application with reference to specific embodiments and accompanying drawings of this application. Apparently, the described embodiments are merely some but not all of the embodiments of this application. All other embodiments obtained by a person of ordinary skill in the art based on the embodiments of this application without creative efforts shall fall within the protection scope of this application.

The technical solutions disclosed in the embodiments of this application are hereinafter described in detail with reference to the accompanying drawings.

As shown in FIG. 1 to FIG. 4, this application discloses a camera module, where the camera module includes a photosensitive chip 400, a first lens 210, a second lens 220, and a plurality of reflective members. Certainly, the camera module may further include other structures such as a housing 100. For text brevity, details are not described herein again.

Figure 1:
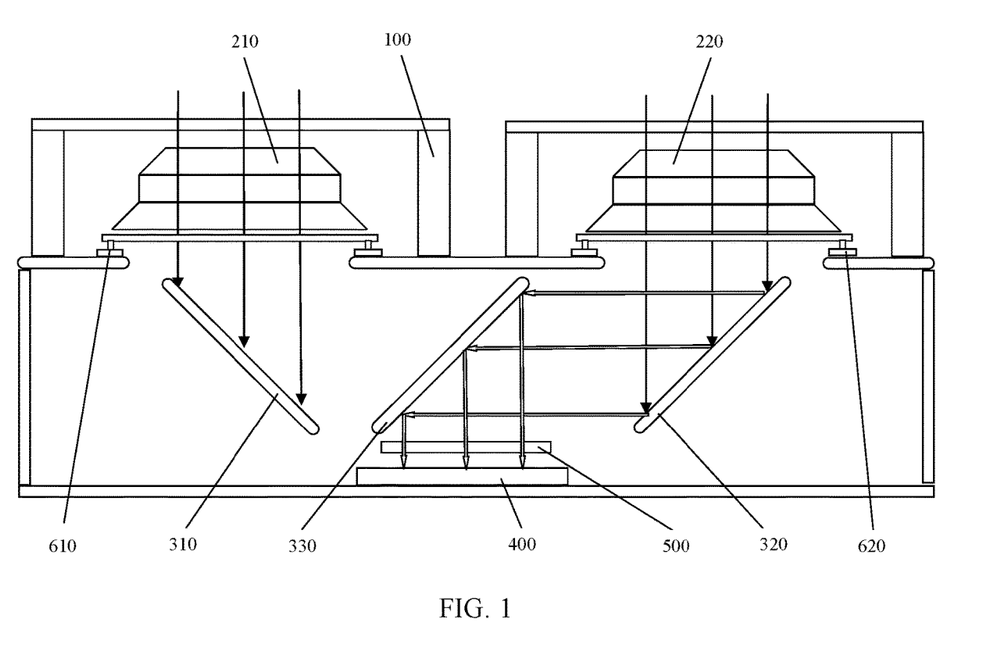
FIG. 1 is a schematic diagram of a structure of a camera module according to an embodiment of this application.

The photosensitive chip 400 is an imaging sensor, and the photosensitive chip 400 is a Bayer array sensor, that is, all photosensitive pixels in the photosensitive chip 400 are arranged in a Bayer array. The photosensitive chip 400 includes a plurality of pixel regions arranged in rows and columns, each pixel region includes four sub pixel regions, and the four sub pixel regions are arranged in a 2×2 matrix. The four sub pixel regions may include two green pixels, one blue pixel, and one red pixel, and the two green pixels are arranged diagonally. The four sub pixel regions in each pixel region may be a first sub pixel region, a second sub pixel region, a third sub pixel region, and a fourth sub pixel region respectively.

Usually, the photosensitive chip 400 may include a filter array layer and a photosensitive layer. Light passes through the filter array layer and illuminates the photosensitive layer. The filter array layer can filter light of different colors, so that after the light passes through the filter array layer, light of only one color, such as red, blue, or green, is retained.

As described above, the photosensitive chip 400 includes a plurality of pixel regions, and each pixel region includes four sub pixel regions. In detail, each sub pixel region is part of the photosensitive chip 400, that is, each sub pixel region may include a sub filter layer and a sub photosensitive layer, and there are a plurality of sub pixel regions. Further, all sub filter layers constitute the filter array layer, and all sub photosensitive layers constitute the photosensitive layer.

In a part corresponding to each pixel region in the filter array layer of the Bayer array sensor, four filters are disposed, and the four filters are in a one-to-one correspondence with four sub pixel regions in one pixel region; and the four filters generally include a red light filter, a blue light filter, and two green light filters, RGGB for short. In a case that different types of filters are disposed in different sub pixel regions on the photosensitive layer, bands of images generated through regions of the photosensitive layer corresponding to different sub pixel regions are also different.

The first lens 210 and the second lens 220 may be mounted on the housing 100 of the camera module in various ways. In some embodiments, the first lens 210 and the second lens 220 may be fixedly connected to the housing 100, or may be movably connected to the housing 100. Fields of view of the first lens 210 and the second lens 220 are the same, that is, light may be incident from the first lens 210, or may be incident from the second lens 220 from a corresponding position on the second lens 220. Specifically, parameters such as structures and orientations of the first lens 210 and the second lens 220 may be designed, so that the fields of view of the first lens 210 and the second lens 220 are the same.

More specifically, the structures of the first lens 210 and the second lens 220 are the same, and both can provide light distribution for light. Both the number of lens elements in the first lens 210 and the number of lens elements in the second lens 220 may be determined based on an actual situation. In some embodiments, the first lens 210 and the second lens 220 each include a plurality of lens elements arranged spaced apart, and axes of the plurality of lens elements coincide. The plurality of lens elements may include at least one convex lens element and at least one concave lens element to improve light distribution effects of the first lens 210 and the second lens 220.

The reflective member has a reflective function, that is, light arriving at the reflective member can be reflected by the reflective member, and the light continues to propagate along a reflection direction. Specifically, the reflective member may be made of a material such as glass or plastic coated with a non-transparent material on one side. An arrangement of the reflective members may be determined based on an actual situation such as the number of reflective members. By enabling the first lens and the second lens to fit the reflective members, it can be ensured that light entering the camera module from the first lens and the second lens can arrive at the photosensitive chip 400. Certainly, the photosensitive chip 400 can receive light incident from only one of the first lens and the second lens at the same time.

Both the first lens 210 and the second lens 220 fit the photosensitive chip 400 by using the plurality of reflective members. In some embodiments, the number of reflective members may be specifically two, three, or more. In a case of two reflective members, the photosensitive chip 400 may be disposed opposite to the first lens 210, the second lens 220 may be disposed on one side of the first lens 210, one of the two reflective members may be fixed on the housing 100 of the camera module in a bonding manner, and the reflective member is obliquely oriented to the second lens 220; the other reflective member may be rotatably connected to the housing 100 of the camera module through a rotating member such as a rotating shaft, and the reflective member is obliquely oriented to the photosensitive chip; and cooperation between the two reflective members can make light incident from the second lens 220 reflected to the photosensitive chip 400 through the two reflective members. Moreover, the reflective member oriented to the photosensitive chip may be rotated or moved to avoid the photosensitive chip, so that there is no blocking between the first lens 210 and the photosensitive chip 400, that is, light incident from the first lens can arrive at the photosensitive chip.

In this application, a first image is generated through a first sub pixel region of the photosensitive chip 400 based on light incident from the first lens 210, a second image is generated through a second sub pixel region of the photosensitive chip 400 based on light incident from the second lens 220, content of the first image and the second image is the same, and sub pixel regions equivalent to the first sub pixel region and the second sub pixel region in a same pixel region are any two sub pixel regions in the pixel region.

As described above, because the fields of view of the first lens and the second lens are the same, content of images generated based on light incident from same positions on the first lens and the second lens is the same. Further, positions of the two lenses of the first lens and the second lens relative to the photosensitive chip may be designed, so that a position to which the light incident from the first lens is projected on the photosensitive chip is different from a position to which the light incident from the second lens is projected on the photosensitive chip. In this way, when light emitted by a same scene enters the photosensitive chip through the first lens and the second lens, projection positions of the light are different, that is, the light is projected on the first sub pixel region and the second sub pixel region respectively. In a case that a relative position relationship between the first lens 210 and the photosensitive chip is different from a relative position relationship between the second lens 220 and the photosensitive chip, relative positions of the first sub pixel region and the second sub pixel region are also different. In addition, in a case that a position of the first lens 210 relative to the photosensitive chip is greatly different from a position of the second lens 220 relative to the photosensitive chip, the first sub pixel region and the second sub pixel region may be located in two pixel regions.

However, because there are corresponding filters for both the first sub pixel region and the second sub pixel region, and structures of the plurality of pixel regions on the photosensitive chip 400 are all the same, a pixel region in which the first sub pixel region is located definitely includes a sub pixel region of a same type as a filter corresponding to the second sub pixel region; and correspondingly, a pixel region in which the second sub pixel region is located also definitely includes a sub pixel region of a same type as a filter corresponding to the first sub pixel region. Therefore, the first sub pixel region can be equivalent to another sub pixel region in the pixel region in which the second sub pixel region is located.

In addition, because the sub pixel regions equivalent to the first sub pixel region and the second sub pixel region in the same pixel region are any two sub pixel regions in the pixel region, when the equivalent region of the first sub pixel region is in the pixel region in which the second sub pixel region is located, the equivalent region of the first sub pixel region is definitely not the second sub pixel region; and correspondingly, when the equivalent region of the second sub pixel region is in the pixel region in which the first sub pixel region is located, the equivalent region of the second sub pixel region is definitely not the first sub pixel region.

In a case that the foregoing technical solution is used, a light beam incident from a center of the first lens 210 may be directed toward a first sub pixel region corresponding to a red filter in the photosensitive chip 400, and a light beam incident from a center of the second lens 220 may be directed toward a second sub pixel region corresponding to a green filter in the photosensitive chip 400. Alternatively, a light beam incident from a center of the first lens 210 may be directed toward a first sub pixel region corresponding to a blue filter in the photosensitive chip 400, and a light beam incident from a center of the second lens 220 may be directed toward a second sub pixel region corresponding to a green filter in the photosensitive chip 400. Alternatively, a light beam incident from a center of the first lens 210 may be directed toward a first sub pixel region corresponding to a first green filter in the photosensitive chip 400, and a light beam incident from a center of the second lens 220 may be directed toward a second sub pixel region corresponding to a second green filter in the photosensitive chip 400, where a red filter is adjacent below the first green filter, a blue filter is adjacent to the right of the first green filter, a red filter is adjacent to the left of the second green filter, and a blue filter is adjacent above the left of the second green filter, that is, positions of the first green filter and the second green filter in a pixel region are different.

In summary, a filter processing result of the foregoing light beam by the filter corresponding to the first sub pixel region in the photosensitive chip 400 is different from a filtering processing result of the foregoing light beam by the filter corresponding to the second sub pixel region in the photosensitive chip 400. Therefore, the light corresponding to the same position can be processed separately by the two filters, two images with the same content but different bands are generated, and based on the first image and the second image generated by the photosensitive chip 400, composition is performed by using a preset algorithm. This can increase real photosensitive pixels of each filter channel in the generated composited image, further improve definition of the image, achieve a better image presentation effect, and improve a final image quality level and user experience.

As described above, the relative positions of the first sub pixel region and the second sub pixel region may be determined based on the positions of the first lens and the second lens relative to the photosensitive chip. In some embodiments, the positions of the first lens and the second lens relative to the photosensitive chip are designed to achieve an objective of generating the first image and the second image with the same content but different bands. More specifically, a difference between the arrangement positions of the first lens and the second lens relative to the photosensitive chip may be a side length of one sub pixel region, or may be a sum of a side length of one sub pixel region and side lengths of n pixel regions, where n is an integer, and n≥0.

In addition, a direction of mutual misalignment between the first lens 210 and the second lens 220 may be determined based on an actual situation. For example, the first lens 210 may be staggered to the left relative to the second lens 220 by a size equal to a side length of a sub pixel region, or the first lens 210 may be staggered downward relative to the second lens 220 by a size equal to a side length of a sub pixel region, or the first lens 210 may be staggered to the lower left relative to the second lens 220 by a size equal to a diagonal length of a sub pixel region. Moreover, in a case that misalignment directions of the first lens 210 and the second lens 220 are different, types of filters corresponding to the first sub pixel region generating the first image and the second sub pixel region generating the second image are also different.

Figure 5:
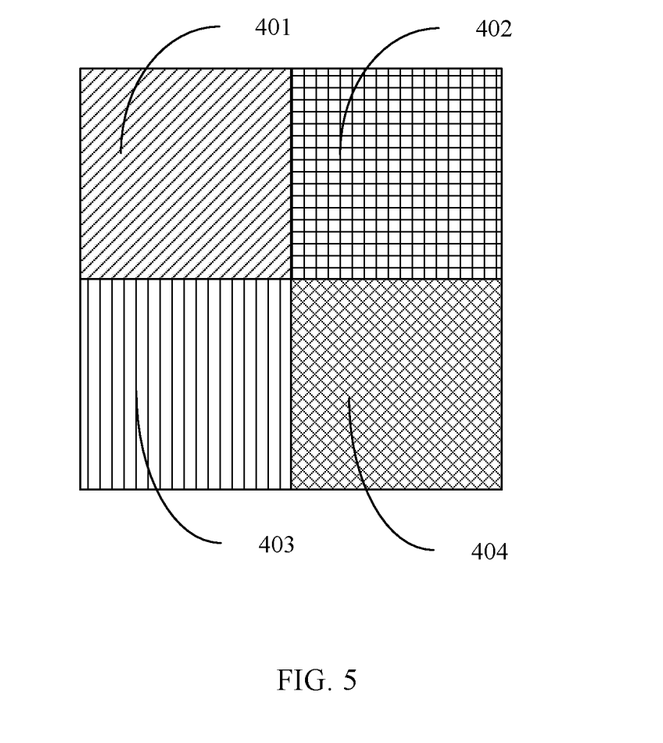
FIG. 5 is a schematic diagram of a structure of a pixel region of a photosensitive chip in a camera module according to an embodiment of this application.

More visually, FIG. 5 shows distribution of four sub pixel regions in each pixel region in the photosensitive chip, where the four sub pixel regions are a first sub pixel region 401, a second sub pixel region 402, a third sub pixel region 403, and a fourth sub pixel region 404 respectively. The first sub pixel region 401 may be oriented to the center of the first lens, that is, light incident from the center of the first lens may be projected into the first sub pixel region 401. Correspondingly, a second sub pixel region 402' may be oriented to the center of the second lens, that is, light incident from the center of the second lens may be projected into the second sub pixel region 402'. Certainly, the foregoing orientations are not necessarily mutual orientations in a physical structure, and may also be light paths. For example, by using the reflective members, a path of light incident from the center of the second lens and received by the second sub pixel region 402' of the photosensitive chip is a broken line, and it may also be considered that the center of the second lens is disposed opposite to the second sub pixel region 402'.

Although the second sub pixel region 402' and the second sub pixel region 402 may correspond to a same type of filter, the two sub pixel regions may be located in two pixel regions, and a pixel region in which the second sub pixel region 402' is located further includes a first sub pixel region 401', a third sub pixel region 403', and a fourth sub pixel region 404'.

Figure 6:
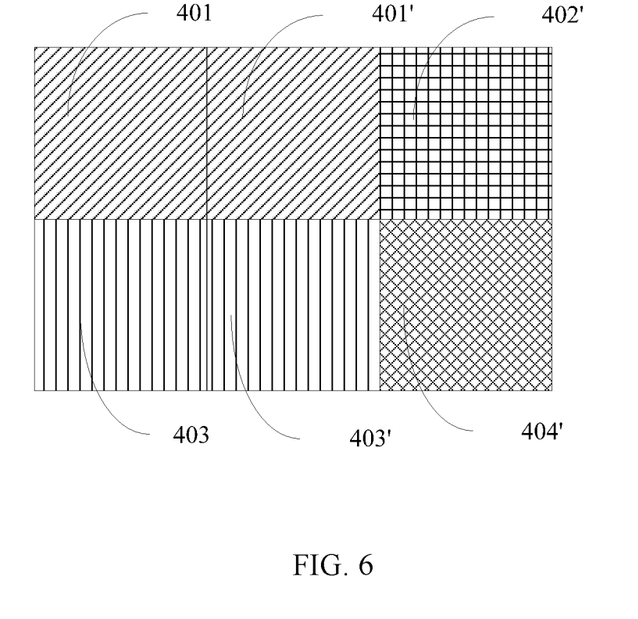
FIG. 6 is a comparison diagram of relative positions of a pixel region in which a first sub pixel region is located and a pixel region in which a second sub pixel region is located in a camera module according to an embodiment of this application.
Figure 7:
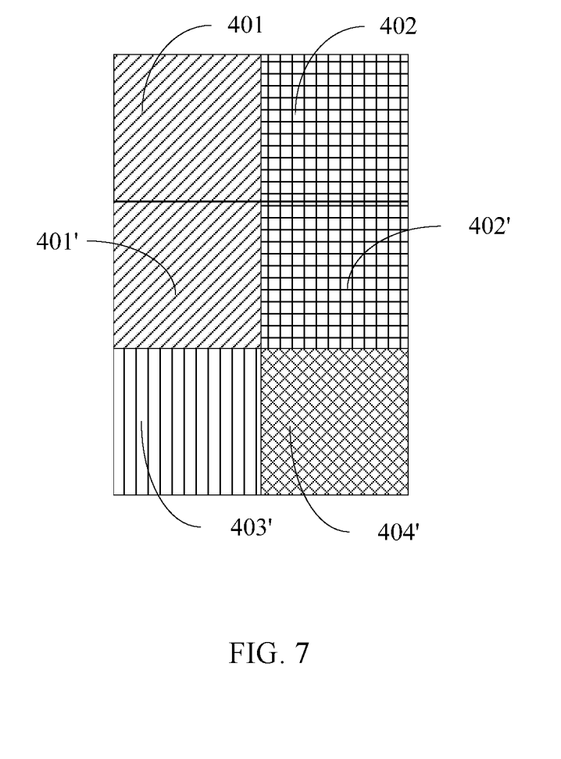
FIG. 7 is another comparison diagram of relative positions of a pixel region in which a first sub pixel region is located and a pixel region in which a second sub pixel region is located in a camera module according to an embodiment of this application.
Figure 8:
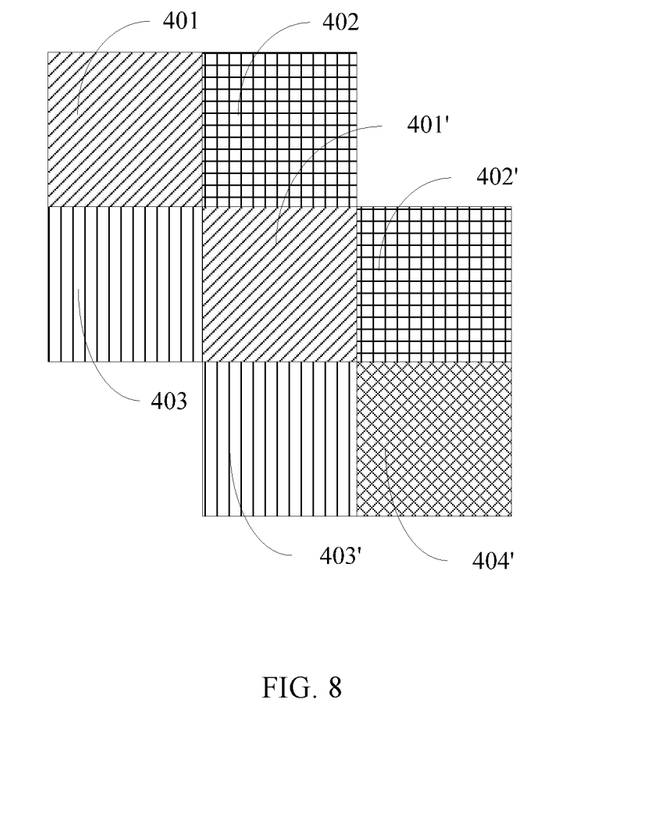
FIG. 8 is still another comparison diagram of relative positions of a pixel region in which a first sub pixel region is located and a pixel region in which a second sub pixel region is located in a camera module according to an embodiment of this application.

In the process of arranging the first lens and the second lens, assuming that a solution shown in FIG. 5 is distribution of each sub pixel region that is in a pixel region of the photosensitive chip and corresponding to the first lens, each sub pixel region that is in a pixel region of the photosensitive chip and corresponding to the second lens may be in any one of FIG. 6 to FIG. 8, that is, the first lens 210 is staggered to the left or downward relative to the second lens 220 by a size equal to a side length of a sub pixel region, or staggered to the lower left by a size equal to a diagonal length of a sub pixel region.

In the camera module provided in this embodiment of this application, the first lens and the second lens fit the photosensitive chip 400 by using the reflective members; when different lenses fit the photosensitive chip, the first image can be generated through the first sub pixel region of the photosensitive chip 400, and the second image with the same content as the first image can be generated through the second sub pixel region of the photosensitive chip 400; in addition, the sub pixel regions equivalent to the first sub pixel region and the second sub pixel region in the same pixel region are any two sub pixel regions in the pixel region. Therefore, in two imaging processes, the photosensitive chip 400 obtains different filter processing results for the incident light corresponding to the same position, and further composites the first image and the second image by using a preset algorithm. This can increase real photosensitive pixels of each filter channel in the generated composited image, further improve definition of the image, achieve a better image presentation effect, and improve a final image quality level and user experience.

In some embodiments, the camera module further includes a driving member, both the first lens and the second lens movably fit the photosensitive chip 400 by using the driving member, the driving member is capable of driving the first lens 210 to switch between a first position and a third position, and the driving member is capable of driving the second lens 220 to switch between a second position and a fourth position;

in a case that the first lens 210 is located at the first position, the first image is generated through the first sub pixel region of the photosensitive chip 400 based on the light incident from the first lens 210; in a case that the first lens 210 is located at the third position, a third image is generated through the third sub pixel region of the photosensitive chip 400 based on the light incident from the first lens 210; in a case that the second lens 220 is located at the second position, the second image is generated through the second sub pixel region of the photosensitive chip 400 based on the light incident from the second lens 220; in a case that the second lens 220 is located at the fourth position, the first image is generated through the first sub pixel region of the photosensitive chip 400 based on the light incident from the second lens 220, that is, the image generated when the second lens is located at the fourth position is the same as the image generated when the first lens is located at the first position; and content of the first image, the second image, and the third image is all the same, and sub pixel regions equivalent to the first sub pixel region, the second sub pixel region, and the third sub pixel region in the same pixel region are any three sub pixel regions in the pixel region.

As described above, the pixel region includes four sub pixel regions arranged in a 2×2 matrix. In this embodiment, one of the first lens and the second lens is capable of moving along a first direction, the other is capable of moving along a second direction, and the first direction is perpendicular to the second direction. Therefore, when the first lens and the second lens respectively fit the photosensitive chip, one of the generated images is duplicate, that is, the first image and a fourth image are the same. In a working process of the camera module, the camera module can be calibrated by using the first image and the fourth image.

In the case that the foregoing technical solution is used, a manner of filtering the light corresponding to the same position by the photosensitive chip 400 may be further added, and the first image, the second image, and the third image are composited by using a preset algorithm, so that the number of real photosensitive pixels of each filter channel in the composited image can be further increased. Specifically, the types of filters corresponding to the first sub pixel region, the second sub pixel region, and the third sub pixel region may be obtained based on the positions of the first lens and the second lens relative to the photosensitive chip.

In some embodiments, the positions of the first lens 210 and the second lens 220 relative to the photosensitive chip 400 are designed, so that the first sub pixel region, the second sub pixel region, and the third sub pixel region can correspond to the green filter, the red filter, and the blue filter. This can improve definition of photosensitive pixels corresponding to R, G, and B in the image, and make the effect of the generated image better. More specifically, when the foregoing technical solution is used, in comparison with a solution in which light is directly incident on the photosensitive chip, definition of R and B images is increased three times, and the definition of the G image is doubled, so that the definition of the image is greatly improved.

In a process in which the driving member drives the first lens 210 and the second lens 220 to move, by precisely controlling a driving amount of the driving member, it can be ensured that the first lens 210 and the second lens 220 can move by a preset displacement amount when moving, where the preset displacement amount may be a side length of one sub pixel region. To reduce difficulty in controlling the camera module, in another embodiment of this application, optionally, the camera module further includes a limiting member 600, and both the first lens and the second lens may movably fit the photosensitive chip by using the limiting member 600.

Figure 2:
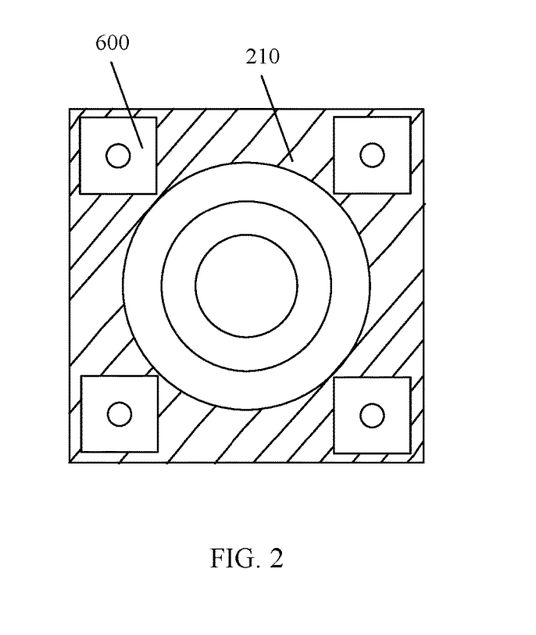
FIG. 2 is an assembly diagram between a first lens and a limiting member in a camera module according to an embodiment of this application.

The limiting member 600 includes a limiting base 601 and a connecting portion 602, and the limiting base or the connecting portion is connected to the driving member. Correspondingly, the first lens may also be connected to the connecting portion. For example, the limiting base may be fixed on the housing, and the first lens and a driving head of the driving member are both connected to the connecting portion, so that the driving member drives the first lens to move. During moving of the first lens, the connecting portion is limited by the limiting base. Therefore, the displacement amount and a displacement direction of the first lens can be controlled by a limited fitting relationship between the limiting base and the connecting portion, and driving difficulty is reduced. Correspondingly, the second lens may also be connected to the housing by using the limiting member.

The limiting base has a limiting groove, the connecting portion is disposed in the limiting groove, the connecting portion is in limited fitting with the limiting groove in the first direction, the driving member is capable of driving the connecting portion to move between the first position and the second position along the second direction in the limiting groove, and further, a moving direction of the first lens can be limited by using the limiting groove. In addition, a moving distance of the connecting portion moving from the first position to the second position is equal to a side length of a sub pixel region, and the first direction is perpendicular to the second direction. In this case, the displacement amount of the first lens may be further limited.

Specifically, the limiting member may be a micro-electromechanical system. The limiting member can cause the first lens and the second lens to generate pixel-level displacement to ensure that the first lens 210 can accurately move between the first position and the third position, and further ensure that the second lens 220 can move more accurately between the second position and the fourth position, thereby reducing difficulty in controlling the displacement of the first lens and the second lens.

Figure 3:
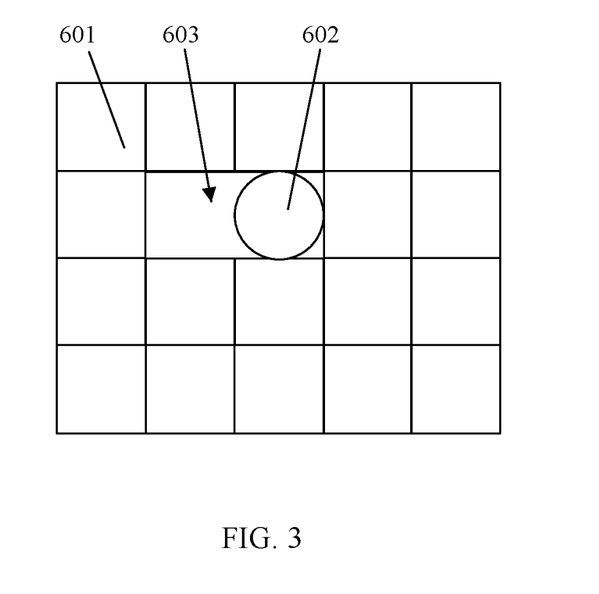
FIG. 3 is a schematic diagram of a first limiting member in a camera module according to an embodiment of this application.
Figure 4:
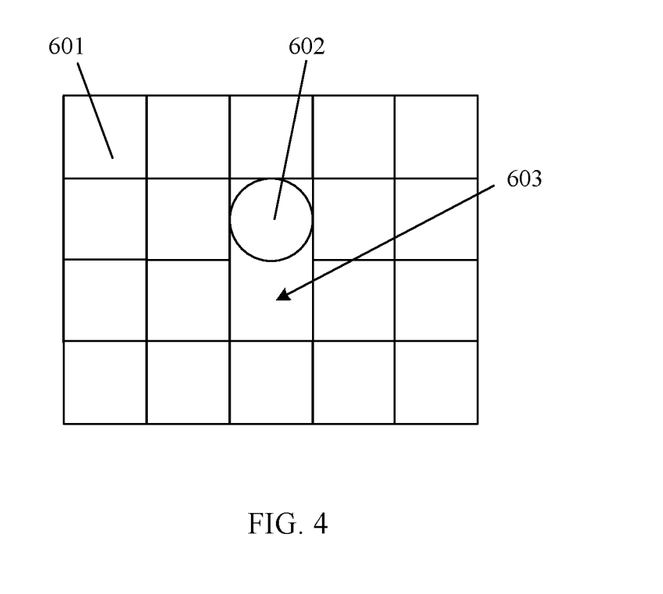
FIG. 4 is a schematic diagram of a second limiting member in a camera module according to an embodiment of this application.

In addition, when the first lens 210 and the second lens 220 are mounted by using the limiting member, because the moving directions of the first lens 210 and the second lens 220 are perpendicular to each other, arrangement directions of a limiting member connected to the first lens and a limiting member connected to the second lens may be perpendicular to each other. Specifically, the first lens is connected to the housing by using a first limiting member 610, and the second lens is connected to the housing by using a second limiting member 620. Because arrangement directions of the first limiting member 610 and the second limiting member 620 are perpendicular to each other, an extension direction of a limiting groove 603 on the first limiting member 610 and an extension direction of a limiting groove 603 on the second limiting member 620 can also be perpendicular to each other. This ensures that the first lens can move between the first position and the third position, and ensures that the second lens can move between the second position and the fourth position.

A size of the limiting groove on the limiting base in the first direction and that in the second direction may be determined based on parameters such as the structure and size of the connecting portion, and it is only necessary to ensure that a moving distance of the connecting portion moving in the limiting groove satisfies the foregoing requirement. In some embodiments, the size of the connecting portion in the first direction and that in the second direction are both equal to a side length of a sub pixel region. In this case, a size of a bottom surface of the limiting groove may be equal to a size of two spliced sub pixel regions. Therefore, difficulty in the design and machining of the limiting groove is relatively low, and a more reliable limiting relationship between the connecting portion and the limiting groove can be ensured. Specifically, the connecting portion may be a columnar structural member with a square bottom surface. In another embodiment of this application, the connecting portion 602 may be a cylindrical structural member. In this case, a contact area between the connecting portion 602 and the limiting groove 603 is relatively small, and this can reduce difficulty in relative movement between the two, to reduce difficulty in driving.

Optical axes of the first lens 210 and the second lens 220 are both perpendicular to a photosensitive surface of the photosensitive chip 400, that is, the two optical axes are perpendicular to a plane in which the photosensitive surface of the photosensitive chip 400 is located, that is, the photosensitive chip faces the first lens and the second lens. In this case, difficulty in the design and mounting of the first lens, the second lens, and the photosensitive chip are relatively low. In addition, light sensitivity of the photosensitive chip 400 can be improved, and the imaging effect can be improved. Certainly, in presence of a corresponding requirement, the photosensitive chip 400 may not face the first lens 210. For example, the camera module may be disposed as a periscope module, and this can increase a zoom ratio of the camera module.

As described above, there may be two reflective members. In another embodiment of this application, optionally, there are three reflective members, including a first reflective member 310, a second reflective member 320, and a third reflective member 330, where the first reflective member 310 and the second reflective member 320 are both fixedly disposed opposite to the photosensitive chip 400, the third reflective member 330 is located between the first reflective member 310 and the second reflective member 320, and the third reflective member 330 rotatably fits the photosensitive chip 400.

Specifically, the photosensitive chip may be specifically disposed between the first lens 210 and the second lens 220, and both the first lens and the second lens fit the photosensitive chip by using two reflective members, where the third reflective member is a common reflective member, and the third reflective member can rotate between different orientations relative to the photosensitive chip by using a motor or another rotating driving member. As the third reflective member rotates, the third reflective member may face the first reflective member or the second reflective member, thereby ensuring that the first lens 210 fits the photosensitive chip by using the first reflective member and the third reflective member, so that the second lens 220 can fit the photosensitive chip by using the second reflective member and the third reflective member. In this case, consistency of the first image and the second image generated by the photosensitive chip by the first lens and the second lens can be further improved, and a presentation effect of the composited image is improved.

In some embodiments, the camera module provided in this embodiment of this application further includes an infrared filter 500, and the infrared filter 500 is disposed on a light-incident side of the photosensitive chip 400. The infrared filter 500 can provide a filtering effect for the light incident into the camera module through the first lens 210 or the second lens 220, thereby filtering unnecessary light projected into the photosensitive chip 400, preventing false colors and/or moirés in the images generated by the photosensitive chip 400, and improving effective definition and color reproduction of the photosensitive chip 400.

In some embodiments, at least one of the first lens 210 and the second lens 220 is an extended depth-of-field lens. Passage focuses of the three R, G, and B filter channels of the first lens 210 and/or the second lens 220 are designed to be located at different positions, and the three passage focuses cover three focal ranges. This increases longitudinal chromatic aberrations of the three R, G, and B bands, and achieves an objective of covering three distances: far, middle, and near. The three distances far, middle, and near are relative concepts, that is, a far distance is a position farther from the middle distance, and a near distance is a position closer to the middle distance.

By using the foregoing technical solution for the first lens 210 or the second lens 220, it is possible to take three photos corresponding to R, G, and B channels, and the three photos are respectively focused on the foregoing three distances far, middle, and near. Then based on a restoration algorithm, a window detection function may be used to detect an entire field of view region, and determine which of the three photos corresponding to R, G, and B channels in each window is the clearest. Then, based on the clearest photo, definition transformation is performed on the other two photos by using a deconvolution algorithm, and a relatively clear full-distance photo is composited.

Based on the camera module disclosed in any one of the foregoing embodiments, an embodiment of this application further provides an electronic device. The electronic device includes the camera module provided in any one of the foregoing embodiments. Certainly, the electronic device further includes other components such as a display module, a housing, and a battery. For text brevity, details are not described herein again.

The electronic device disclosed in this embodiment of this application may be a smartphone, a tablet computer, an e-book reader, or a wearable device. Certainly, the electronic device may alternatively be any other device. This is not limited in this embodiment of this application.

In the foregoing embodiments of this application, differences between the embodiments are highlighted. In absence of contradictions of optimization features between the embodiments, the embodiments may be combined to form a better embodiment. For text brevity, details are not described herein again.

The previous descriptions are merely embodiments of this application, and are not intended to limit this application. A person skilled in the art can make various modifications and changes to this application. Any modification, equivalent replacement, or improvement made without departing from the spirit and principle of this application shall fall within the scope of the claims in this application.

What is claimed is:

1. A camera module, comprising a photosensitive chip, a first lens, a second lens, and a plurality of reflective members, wherein the photosensitive chip is a Bayer array sensor, the photosensitive chip comprises a plurality of pixel regions arranged in rows and columns, each pixel region comprises four sub pixel regions, fields of view of the first lens and the second lens are the same, and both the first lens and the second lens fit the photosensitive chip by using the plurality of reflective members; and a first image is generated through a first sub pixel region of the photosensitive chip based on light incident from the first lens, a second image is generated through a second sub pixel region of the photosensitive chip based on light incident from the second lens, content of the first image and the second image is the same, and sub pixel regions equivalent to the first sub pixel region and the second sub pixel region in a same pixel region are any two sub pixel regions in the pixel region, wherein the camera module further comprises a driving member, both the first lens and the second lens movably fit the photosensitive chip by using the driving member, the driving member is capable of driving the first lens to switch between a first position and a third position, and the driving member is capable of driving the second lens to switch between a second position and a fourth position;

in a case that the first lens is located at the first position, the first image is generated through the first sub pixel region of the photosensitive chip based on the light incident from the first lens;

in a case that the first lens is located at the third position, a third image is generated through a third sub pixel region of the photosensitive chip based on the light incident from the first lens;

in a case that the second lens is located at the second position, the second image is generated through the second sub pixel region of the photosensitive chip based on the light incident from the second lens;

in a case that the second lens is located at the fourth position, the first image is generated through the first sub pixel region of the photosensitive chip based on the light incident from the second lens; and content of the first image, the second image, and the third image is all the same, and sub pixel regions equivalent to the first sub pixel region, the second sub pixel region, and the third sub pixel region in the same pixel region are any three sub pixel regions in the pixel region.

2. The camera module according to claim 1, wherein the camera module further comprises a limiting member, both the first lens and the second lens movably fit the photosensitive chip by using the limiting member, the limiting member comprises a limiting base and a connecting portion, the limiting base or the connecting portion is connected to the driving member, the limiting base has a limiting groove, the connecting portion is disposed in the limiting groove, the connecting portion is in limited fitting with the limiting groove in a first direction, the driving member is capable of driving the connecting portion to move between the first position and the second position along a second direction in the limiting groove, a moving distance of the connecting portion moving from the first position to the second position is equal to a side length of the sub pixel region, and the first direction is perpendicular to the second direction.

3. The camera module according to claim 2, wherein sizes of the connecting portion in the first direction and the second direction are both equal to the side length of the sub pixel region.

4. The camera module according to claim 3, wherein the connecting portion is a cylindrical structural member.

5. The camera module according to claim 1, wherein optical axes of the first lens and the second lens are both perpendicular to a photosensitive surface of the photosensitive chip.

6. The camera module according to claim 5, wherein the plurality of reflective members comprises a first reflective member, a second reflective member, and a third reflective member, wherein the first reflective member and the second reflective member are both fixedly disposed relative to the photosensitive chip, the third reflective member is located between the first reflective member and the second reflective member, and the third reflective member rotatably fits the photosensitive chip.

7. The camera module according to claim 1, wherein the camera module further comprises an infrared filter, and the infrared filter is disposed on a light-incident side of the photosensitive chip.

8. The camera module according to claim 1, wherein at least one of the first lens and the second lens is an extended depth-of-field lens.

9. An electronic device, comprising a camera module, wherein the camera module comprises a photosensitive chip, a first lens, a second lens, and a plurality of reflective members,
wherein the photosensitive chip is a Bayer array sensor, the photosensitive chip comprises a plurality of pixel regions arranged in rows and columns, each pixel region comprises four sub pixel regions, fields of view of the first lens and the second lens are the same, and both the first lens and the second lens fit the photosensitive chip by using the plurality of reflective members; and
a first image is generated through a first sub pixel region of the photosensitive chip based on light incident from the first lens, a second image is generated through a second sub pixel region of the photosensitive chip based on light incident from the second lens, content of the first image and the second image is the same, and sub pixel regions equivalent to the first sub pixel region and the second sub pixel region in a same pixel region are any two sub pixel regions in the pixel region,
wherein the camera module further comprises a driving member, both the first lens and the second lens movably fit the photosensitive chip by using the driving member, the driving member is capable of driving the first lens to switch between a first position and a third position, and the driving member is capable of driving the second lens to switch between a second position and a fourth position;
in a case that the first lens is located at the first position, the first image is generated through the first sub pixel region of the photosensitive chip based on the light incident from the first lens;
in a case that the first lens is located at the third position, a third image is generated through a third sub pixel region of the photosensitive chip based on the light incident from the first lens;
in a case that the second lens is located at the second position, the second image is generated through the second sub pixel region of the photosensitive chip based on the light incident from the second lens;
in a case that the second lens is located at the fourth position, the first image is generated through the first sub pixel region of the photosensitive chip based on the light incident from the second lens; and
content of the first image, the second image, and the third image is all the same, and sub pixel regions equivalent to the first sub pixel region, the second sub pixel region, and the third sub pixel region in the same pixel region are any three sub pixel regions in the pixel region.

10. The electronic device according to claim 9, wherein the camera module further comprises a limiting member, both the first lens and the second lens movably fit the photosensitive chip by using the limiting member, the limiting member comprises a limiting base and a connecting portion, the limiting base or the connecting portion is connected to the driving member, the limiting base has a limiting groove, the connecting portion is disposed in the limiting groove, the connecting portion is in limited fitting with the limiting groove in a first direction, the driving member is capable of driving the connecting portion to move between the first position and the second position along a second direction in the limiting groove, a moving distance of the connecting portion moving from the first position to the second position is equal to a side length of the sub pixel region, and the first direction is perpendicular to the second direction.

11. The electronic device according to claim 10, wherein sizes of the connecting portion in the first direction and the second direction are both equal to the side length of the sub pixel region.

12. The electronic device according to claim 11, wherein the connecting portion is a cylindrical structural member.

13. The electronic device according to claim 9, wherein optical axes of the first lens and the second lens are both perpendicular to a photosensitive surface of the photosensitive chip.

14. The electronic device according to claim 13, wherein the plurality of reflective members comprises a first reflective member, a second reflective member, and a third reflective member, wherein the first reflective member and the second reflective member are both fixedly disposed relative to the photosensitive chip, the third reflective member is located between the first reflective member and the second reflective member, and the third reflective member rotatably fits the photosensitive chip.

15. The electronic device according to claim 9, wherein the camera module further comprises an infrared filter, and the infrared filter is disposed on a light-incident side of the photosensitive chip.

16. The electronic device according to claim 9, wherein at least one of the first lens and the second lens is an extended depth-of-field lens.

\* \* \* \* \*